United States Patent
Wu

(10) Patent No.: US 8,029,901 B2
(45) Date of Patent: Oct. 4, 2011

(54) POLYARYL ETHER COPOLYMER CONTAINING INTERMEDIATE TRANSFER MEMBERS

(75) Inventor: Jin Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 406 days.

(21) Appl. No.: 12/431,822

(22) Filed: Apr. 29, 2009

(65) Prior Publication Data
US 2010/0279214 A1 Nov. 4, 2010

(51) Int. Cl.
*B32B 27/18* (2006.01)
*G03G 15/04* (2006.01)

(52) U.S. Cl. ............... 428/411.1; 428/32.6; 428/195.1; 428/500; 428/704; 430/47.4; 430/48; 430/56

(58) Field of Classification Search .............. 428/32.6, 428/195.1, 500, 704, 411.1; 430/47.4, 48, 430/56
See application file for complete search history.

(56) References Cited

U.S. PATENT DOCUMENTS

| | | | |
|---|---|---|---|
| 5,409,557 A * | 4/1995 | Mammino et al. | 156/137 |
| 5,487,707 A | 1/1996 | Sharf et al. | |
| 5,525,446 A * | 6/1996 | Sypula et al. | 430/47.4 |
| 5,723,264 A * | 3/1998 | Robello et al. | 430/321 |
| 6,118,968 A | 9/2000 | Schlueter et al. | |
| 6,232,025 B1 * | 5/2001 | Srinivasan | 430/58.4 |
| 6,318,223 B1 | 11/2001 | Yu et al. | |
| 6,397,034 B1 | 5/2002 | Tarnawskyj et al. | |
| 6,440,515 B1 | 8/2002 | Thornton et al. | |
| 6,602,156 B2 | 8/2003 | Schlueter, Jr. | |
| 7,031,647 B2 | 4/2006 | Mishra et al. | |
| 7,130,569 B2 | 10/2006 | Goodman et al. | |
| 7,139,519 B2 | 11/2006 | Darcy, III et al. | |
| 2004/0072088 A1 * | 4/2004 | Yu | 430/59.6 |
| 2005/0233230 A1 * | 10/2005 | Carmichael et al. | 430/56 |
| 2008/0063961 A1 * | 3/2008 | Bender et al. | 430/58.75 |
| 2008/0280222 A1 * | 11/2008 | Belknap et al. | 430/58.8 |

FOREIGN PATENT DOCUMENTS

JP EP0550817 A2 * 7/1993

OTHER PUBLICATIONS

Jin Wu, U.S. Appl. No. 12/431,801 on Hydrophobic Fluorinated Nano Diamond Containing Intermediate Transfer Members, filed Apr. 29, 2009.
Jin Wu, U.S. Appl. No. 12/413,638, filed Mar. 30, 2009 on Perfluoropolyether Polymer Grafted Polyaniline Containing Intermediate Transfer Members.
Jin Wu, U.S. Appl. No. 12/413,642, filed Mar. 30, 2009 on Fluorotelomer Grafted Polyaniline Containing Intermediate Transfer Members.
Jin Wu, U.S. Appl. No. 12/413,651, filed Mar. 30, 2009 on Polyimide Polysiloxane Intermediate Transfer Members.
Jin Wu, U.S. Appl. No. 12/129,995, filed May 30, 2008 on Polyimide Intermediate Transfer Components.

* cited by examiner

*Primary Examiner* — Lorna M Douyon
*Assistant Examiner* — Tri V Nguyen
(74) *Attorney, Agent, or Firm* — Oliff & Berridge, PLC

(57) ABSTRACT

A polyaryl ether intermediate transfer media, such as a belt, and a multi layered intermediate transfer media, that includes a supporting substrate, like a polyimide and deposited on the substrate a polyaryl ether.

31 Claims, No Drawings

POLYARYL ETHER COPOLYMER CONTAINING INTERMEDIATE TRANSFER MEMBERS

CROSS REFERENCE TO RELATED APPLICATIONS

Copending U.S. application Ser. No. 12/431,801 filed concurrently herewith, entitled Hydrophobic Fluorinated Nano Diamond Containing Intermediate Transfer Members, the disclosure of which is totally incorporated herein by reference, illustrates an intermediate transfer member comprised of a fluorinated nano diamond.

Copending U.S. application Ser. No. 12/413,638 filed Mar. 30, 2009, entitled Perfluoropolyether Polymer Grafted Polyaniline Containing Intermediate Transfer Members, the disclosure of which is totally incorporated herein by reference, illustrates an intermediate transfer member comprised of a substrate and in contact with the substrate a polyaniline grafted perfluoropolyether phosphoric acid polymer.

Copending U.S. application Ser. No. 12/413,642 filed Mar. 30, 2009, entitled Fluorotelomer Grafted Polyaniline Containing Intermediate Transfer Members, the disclosure of which is totally incorporated herein by reference, illustrates an intermediate transfer member comprised of a substrate, and a layer comprised of polyaniline having grafted thereto a fluorotelomer.

Copending U.S. application Ser. No. 12/413,651 filed Mar. 30, 2009, entitled Polyimide Polysiloxane Intermediate Transfer Members, the disclosure of which is totally incorporated herein by reference, illustrates an intermediate transfer member comprised of at least one of a polyimide/polyetherimide/polysiloxane, and a polyimide polysiloxane.

Illustrated in U.S. application Ser. No. 12/129,995, filed May 30, 2008, entitled Polyimide Intermediate Transfer Components, the disclosure of which is totally incorporated herein by reference, is an intermediate transfer belt comprised of a substrate comprising a polyimide and a conductive component wherein the polyimide is cured at a temperature of for example, from about 175° C. to about 290° C. over a period of time of from about 10 minutes to about 120 minutes.

BACKGROUND

Disclosed are intermediate transfer members, and more specifically, intermediate transfer members useful in transferring a developed image in an electrostatographic, for example xerographic, including digital, image on image, and the like, machines or apparatuses and printers. In embodiments, there are disclosed intermediate transfer members comprised of a polyaryl ether, and more specifically, comprised of a supporting substrate like a polyimide and a polyaryl ether surface layer, where there can be included therein a conductive component, and wherein the polyaryl ether can be generated as a copolymer of a polyaryl ether and a polysulfone.

A number of advantages are associated with the intermediate transfer members of the present disclosure, such as excellent mechanical characteristics, robustness, consistent and excellent surface resistivities, and acceptable adhesion properties, especially when there is included in the intermediate transfer member an adhesive layer; excellent maintained conductivity or resistivity for extended time periods; dimensional stability; ITB humidity insensitivity for extended time periods; excellent dispersability in a polymeric solution; low and acceptable surface friction characteristics; and minimum or substantially no peeling or separation of the layers. In embodiments, specific advantages of the intermediate transfer members of the present disclosure include a high glass transition temperature of, for example, about 265° C., and minimal or substantially no moisture absorption for the members comprised of the polyaryl ethers, available for example, as HTM 2600 from HT Materials Incorporated; and for a layered member comprised of a polyimide supporting substrate and a surface layer thereover of a polyaryl ether, excellent transfer and acceptable cleaning due primarily to the polyaryl ether's low friction coefficient, for example, 30 percent lower than that of a polyimide, while the polyimide base layer imparts reliable mechanical properties.

In aspects thereof, the present disclosure relates to a single layer and multilayered intermediate transfer members, such as a belt (ITB), comprising a polyaryl ether, and also comprising a polyimide supporting substrate and thereover a polyaryl ether, where at least one of the layers optionally includes a conductive component, and an optional adhesive layer situated between the two layers, and which single or multi layered members can be prepared by known solution casting methods and known extrusion molded processes with the optional adhesive layer being generated and applied by known spray coating and flow coating processes. Furthermore, disclosed herein are intermediate transfer members having a surface resistivity of from about $10^9$ to about $10^{13}$ ohm/sq, or from about $10^{10}$ to about $10^{12}$ ohm/sq.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and colorant. Generally, the electrostatic latent image is developed by contacting it with a developer mixture comprised of a dry developer mixture, which usually comprises carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a copy sheet. It is advantageous to transfer the developed image to a coated intermediate transfer web, belt or component, and subsequently transfer with a high transfer efficiency the developed image from the intermediate transfer member to a permanent substrate. The toner image is subsequently usually fixed or fused upon a support, which may be the photosensitive member itself, or other support sheet such as plain paper.

In electrostatographic printing machines wherein the toner image is electrostatically transferred by a potential difference between the imaging member and the intermediate transfer member, the transfer of the toner particles to the intermediate transfer member and the retention thereof should be substantially complete so that the image ultimately transferred to the image receiving substrate will have a high resolution. Substantially about 100 percent toner transfer occurs when most or all of the toner particles comprising the image are transferred, and little residual toner remains on the surface from which the image was transferred.

Intermediate transfer members possess a number of advantages, such as enabling high throughput at modest process speeds; improving registration of the final color toner image in color systems using synchronous development of one or more component colors and using one or more transfer stations; and increasing the number of substrates that can be selected. However, a disadvantage of using an intermediate transfer member is that a plurality of transfer operations is usually needed allowing for the possibility of charge exchange occurring between toner particles, and the transfer member which ultimately can lead to less than complete toner transfer resulting in low resolution images on the image receiving substrate, and image deterioration. When the image is in color, the image can additionally suffer from color shifting and color deterioration.

Attempts at controlling the resistivity of intermediate transfer members by, for example, adding conductive fillers, such as ionic additives and/or carbon black to the outer layer, are disclosed in U.S. Pat. No. 6,397,034 which describes the use of fluorinated carbon filler in a polyimide intermediate transfer member layer. However, there can be problems associated with the use of such fillers in that undissolved particles frequently bloom or migrate to the surface of the fluorinated polymer and cause imperfections to the polymer, thereby causing nonuniform resistivity, which in turn causes poor antistatic properties and poor mechanical strength characteristics. Also, ionic additives on the ITB surface may interfere with toner release. Furthermore, bubbles may appear in the polymer, some of which can only be seen with the aid of a microscope, and others of which are large enough to be observed with the naked eye resulting in poor or nonuniform electrical properties and poor mechanical properties.

In addition, the ionic additives themselves are sensitive to changes in temperature, humidity, and operating time. These sensitivities often limit the resistivity range. For example, the resistivity usually decreases by up to two orders of magnitude or more as the humidity increases from about 20 percent to 80 percent relative humidity. This effect limits the operational or process latitude.

Moreover, ion transfer can also occur in these systems. The transfer of ions leads to charge exchanges and insufficient transfers, which in turn causes low image resolution and image deterioration, thereby adversely affecting the copy quality. In color systems, additional adverse results include color shifting and color deterioration. Ion transfer also increases the resistivity of the polymer member after repetitive use. This can limit the process and operational latitude, and eventually the ion filled polymer member will be unusable.

Therefore, it is desired to provide an intermediate transfer member with a number of the advantages illustrated herein, such as excellent mechanical and humidity insensitivity characteristics, permitting high copy quality where developed images with minimal resolution issues can be obtained. It is also desired to provide a weldable intermediate transfer belt that may not, but could have puzzle cut seams, and instead, has a weldable seam, thereby providing a belt that can be manufactured without labor intensive steps, such as manually piecing together the puzzle cut seam with fingers, and without the lengthy high temperature and high humidity conditioning steps.

REFERENCES

Illustrated in U.S. Pat. No. 7,031,647, is an imageable seamed belt containing a lignin sulfonic acid doped polyaniline.

Illustrated in U.S. Pat. No. 7,139,519, is an intermediate transfer belt, comprising a belt substrate comprising primarily at least one polyimide polymer; and a welded seam.

Illustrated in U.S. Pat. No. 7,130,569, is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is labor intensive and costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

Disclosed in U.S. Pat. No. 6,118,968 is a transfer member with a polyimide base layer, an optional adhesive layer, and a polyphenylene sulfide surface layer.

SUMMARY

In embodiments, there is disclosed an intermediate transfer member comprised of a polyaryl ether; an intermediate transfer member comprised of a first layer and a second layer comprised of a polyaryl ether; an intermediate transfer member comprised of a polyimide base layer, and in contact therewith a polyaryl ether; an intermediate transfer member comprised of a first layer, such as a polyimide thermosetting polyimide, and a second layer coated on the first layer, and which second layer comprises a polyaryl ether, and where at least one of the first layer and second layer further contains a conductive component like carbon black, polyaniline, and other known conductive materials, and further where the multi layered, such as the two layered, member further includes situated between the first and second layer an optional adhesive layer; an apparatus for forming images on a recording medium comprising a charge retentive surface to receive an electrostatic latent image thereon; a development component to apply toner to the charge retentive surface to develop the electrostatic latent image, and to form a developed image on the charge retentive surface; and a polyaryl ether containing intermediate transfer media that functions to transfer the developed image from the charge retentive surface to a substrate, wherein the intermediate transfer media is as illustrated herein.

In addition, the present disclosure provides, in embodiments, an apparatus for forming images on a recording medium comprising a charge retentive surface to receive an electrostatic latent image thereon; a development component to apply toner to the charge retentive surface to develop the electrostatic latent image, and to form a developed image on the charge retentive surface; a weldable polyaryl containing intermediate transfer belt to transfer the developed image from the charge retentive surface to a substrate, and a fixing component.

Examples of the first layer or substrate layer of a number of the intermediate transfer members illustrated herein are, for example, thermoplastic polyimides like KAPTON® KJ, commercially available from E.I. DuPont, Wilmington, Del., as represented by

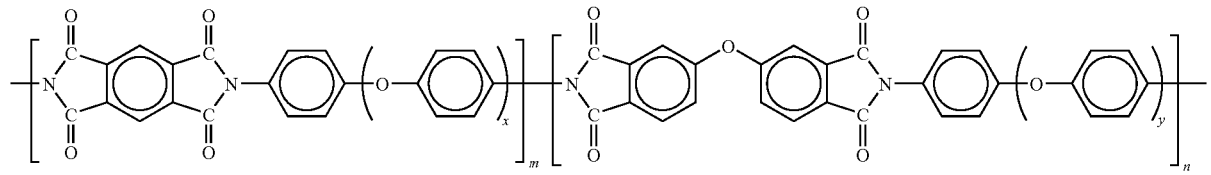

wherein x is equal to 2; y is equal to 2; m and n are from about 10 to about 300; and IMIDEX®, commercially available from West Lake Plastic Company, as represented by

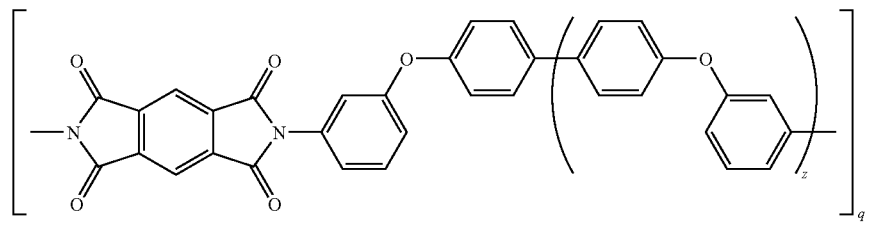

wherein z is equal to 1, and q is from about 10 to about 300.

The thermosetting polyimides selected as the first layer can be cured at suitable temperatures, and more specifically, from about 180° C. to about 260° C. over a short period of time, such as, for example, from about 10 to about 120 minutes, and from about 20 to about 60 minutes, possess, for example, a number average molecular weight of from about 5,000 to about 500,000, or from about 10,000 to about 100,000, and a weight average molecular weight of from about 50,000 to about 5,000,000, or from about 100,000 to about 1,000,000; thermosetting polyimide precursors that are cured at higher temperatures (above 300° C.) than the VTEC™ PI polyimide precursors, and which precursors include, for example, PYRE-M.L® RC-5019, RC-5057, RC-5069, RC-5097, RC-5053 and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, commercially available from E.I. DuPont, Wilmington, Del.; in amounts of, for example, of from about 70 to about 97, or from about 80 to about 95 weight percent of the intermediate transfer member.

The polyimides may be synthesized from prepolymer solutions such as polyamic acid or esters of polyamic acid, or by the reaction of a dianhydride and a diamine. Suitable dianhydrides include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis-(3,4-dicarboxyphenyl)hexafluoropropane dianhydride, 2,2-bis((3,4-dicarboxyphenoxy)phenyl) hexafluoropropane dianhydride, 4,4'-bis(3,4-dicarboxy-2,5, 6-trifluorophenoxy)octafluorobiphenyl dianhydride, 3,3',4, 4'-tetracarboxybiphenyl dianhydride, 3,3',4,4'-tetracarboxybenzophenone dianhydride, di-(3,4-dicarboxyphenoxy)phenyl)ether dianhydride, di-(4-(3,4-dicarboxyphenoxy)phenyl) sulfide dianhydride, di-(3,4-dicarboxyphenyl)methane dianhydride, di-(3,4-dicarboxyphenyl)ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9, 10-perylenetetracarboxylic dianhydride, 2,3,6,7-anthracenetetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4,4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1, 1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis (2,3-dicarboxyphenyl)methane dianhydride, bis(3,4-dicarboxyphenyl)methane dianhydride, 4,4'-(p-phenylenedioxy) diphthalic dianhydride, 4,4'-(m-phenylenedioxy)diphthalic dianhydride, 4,4'-diphenylsulfidedioxybis(4-phthalic acid) dianhydride 4,4'-diphenylsulfonedioxybis(4-phthalic acid) dianhydride, methylenebis(4-phenyleneoxy-4-phthalic acid) dianhydride, ethylidenebis(4-phenyleneoxy-4-phthalic acid) dianhydride, isopropylidenebis-(4-phenyleneoxy-4-phthalic acid)dianhydride, hexafluoroisopropylidenebis-(4-phenyleneoxy-4-phthalic acid)dianhydride, and the like. Exemplary diamines suitable for use in the preparation of the polyimide include aromatic diamines such as 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3,-bis-(gamma-aminopropyl)-tetramethyl-disiloxane, 1,6-diaminohexane, 4,4'-diaminodiphenylmethane, 3,3'-diaminodiphenylmethane, 1,3,-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2, 2',3,3',5,5',6,6'-octafluoro-biphenyl, 4,4'-diamino-2,2',3,3',5, 5',6,6'-octafluorodiphenyl ether, bis[4-(3-aminophenoxy)-phenyl]-sulfide, bis[4-(3-aminophenoxy)phenyl]sulfone, bis [4-(3-aminophenoxy)phenyl]ketone, 4,4'-bis(3-aminophenoxy)biphenyl, 2,2-bis[4-(3-aminophenoxy) phenyl]propane, 2,2-bis[4-(3-aminophenoxy)phenyl]-1,1,1, 3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl) 1,1,1,3,3,3-hexafluoropropane.

The dianhydrides and diamines can, for example, be selected in a weight ratio of dianhydride to diamine of from about 20:80 to about 80:20, or about a 50:50 weight ratio. The aromatic dianhydride (aromatic tetracarboxylic acid dianhydride) and diamine (aromatic diamine) can be selected singly or as a mixture, respectively. The polyimide can be prepared from the dianhydride and diamine by known methods. For example, the dianhydride and the diamine can be suspended or dissolved in an organic solvent as a mixture or separately, and can be reacted to form the polyamic acid, which is thermally or chemically dehydrated; and subsequently the product is separated and purified. The polyimide is heat melted with a known extruder, delivered in the form of a film from a die having a slit nozzle, and a static charge is applied to the film; the film is cooled and solidified with a cooling roller having a surface temperature in the range of the glass transition temperature ($T_g$) of the polymer ($T_g$)—50° C. to ($T_g$)—15° C., transmitted under tension without bringing the film into contact with rollers while further cooling to the room temperature; and then wound up or transferred to a further step.

An example of a polyimide may be prepared by reacting di-(2,3-dicarboxyphenyl)ether dianhydride with 5-amino-1-(p-aminophenyl)-1,3,3-trimethylindane. This polymer is available as Polyimide XU 218 sold by Ciba-Geigy Corporation, Ardsley, N.Y. Other fully imidized polyimides are available from Lenzing Corporation in Dallas, Tex., and are sold as Lenzing P83 polyimide, and by Mitsui Toatsu Chemicals, New York, N.Y. sold as Larc-TPI.

Other suitable polyimides include those formed from various diamines and dianhydrides, such as poly(amidimide), polyetherimide, polysiloxane polyetherimide block copolymer, and the like. Preferred polyimides include aromatic polyimides, such as those formed by reacting pyromellitic acid and diaminodiphenylether, or by imidization of copolymeric acids such as biphenyltetracarboxylic acid and pyromellitic acid with two aromatic diamines such as p-phenylenediamine and diaminodiphenylether. Another suitable polyimide includes pyromellitic dianhydride and benzophenone tetracarboxylic dianhydride copolymeric acids reacted with 2,2-bis[4-(8-aminophenoxy)phenoxy]hexafluoropropane. Other suitable aromatic polyimides include those containing 1,2,1',2'-biphenyltetracarboximide and para-phenylene groups, and those having biphenyltetracarboximide functionality with diphenylether end spacer characterizations.

Examples of polyaryl ethers include those ethers that are available from a number of sources, such as HT Materials Incorporated located in Albany, N.Y. More specifically, the copolymers of a polyaryl ether and a polysulfone selected for the intermediate transfer members illustrated herein, and which ethers are, in embodiments, in contact with a first layer, are represented by the following structures/formulas

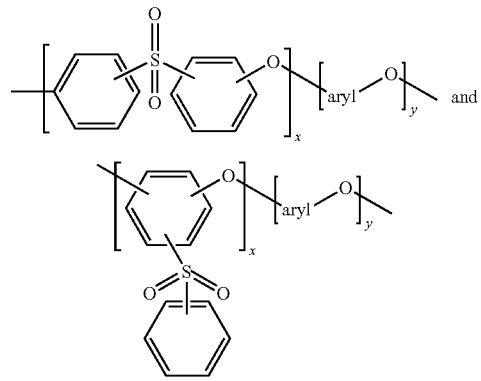

where aryl is at least one of

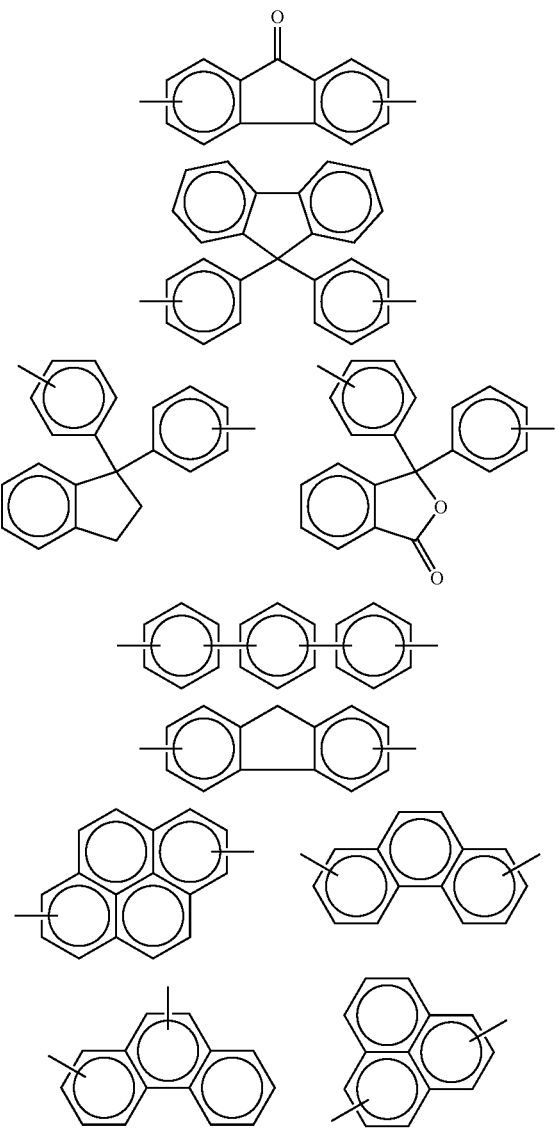

-continued

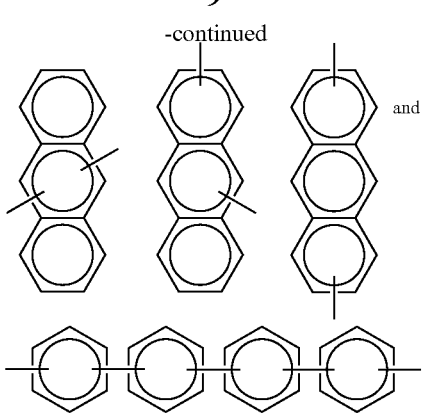

and wherein x and y represent the number segments, and more specifically, where x is from about 50 to about 90 weight percent, or from about 60 to about 80 weight percent; y is from about 10 to about 50 weight percent, or from about 20 to about 40 weight percent; and where the total of the percentages is about 100 percent.

For the polyaryl ether, the polyaryl can contain, for example, from 6 to about 54, from 6 to about 48, or from 6 to about 42 carbon atoms. The number average molecular weight of the polyaryl ether is, for example, from about 10,000 to about 100,000, or from about 20,000 to about 50,000, and the weight average molecular weight of the polyaryl ether is from about 20,000 to about 300,000, or from about 30,000 to about 100,000. The glass transition temperature of the polyaryl ether is from about 250° C. to about 350° C., or from about 260° C. to about 300° C. One specific example of the polyaryl ether is HTM 2600 from HT Materials Inc., Albany, N.Y., which possesses a number average molecular weight of about 11,000, a weight average molecular weight of about 30,000, and a glass transition temperature of about 265° C.

The conductive material, such as a carbon black, polyaniline, and mixtures thereof, is present in at least one layer of the intermediate transfer member in, for example, an amount of from about 1 to about 30 weight percent, from about 3 to about 20 weight percent, or preferably from about 5 to about 15 weight percent.

Examples of the intermediate transfer member carbon blacks include VULCAN® carbon blacks, REGAL® carbon blacks, and BLACK PEARLS® carbon blacks available from Cabot Corporation. Specific examples of conductive carbon blacks are BLACK PEARLS® 1000 (B.E.T. surface area=343 m$^2$/g, DBP absorption=105 ml/g), BLACK PEARLS® 880 (B.E.T. surface area=240 m$^2$/g, DBP absorption=106 ml/g), BLACK PEARLS® 800 (B.E.T. surface area=230 m$^2$/g, DBP absorption=68 ml/g), BLACK PEARLS® L (B.E.T. surface area=138 m$^2$/g, DBP absorption=61 ml/g), BLACK PEARLS® 570 (B.E.T. surface area=110 m$^2$/g, DBP absorption=114 ml/g), BLACK PEARLS® 170 (B.E.T. surface area=35 m$^2$/g, DBP absorption=122 ml/g), VULCAN® XC72 (B.E.T. surface area=254 m$^2$/g, DBP absorption=176 ml/g), VULCAN® XC72R (fluffy form of VULCAN® XC72), VULCAN® XC605, VULCAN® XC305, REGAL® 660 (B.E.T. surface area=112 m$^2$/g, DBP absorption=59 ml/g), REGAL® 400 (B.E.T. surface area=96 m$^2$/g, DBP absorption=69 ml/g), and REGAL® 330 (B.E.T. surface area=94 m$^2$/g, DBP absorption=71 ml/g). Dibutyl phthalate (DBP) absorption by the voids within carbon blacks are used to measure the structure of carbon black. The higher the structure, the more the voids, and the higher the DBP absorption.

In embodiments, the selected polyaniline conductive component has a relatively small particle size of from about 0.5 to about 5 microns, from about 1.1 to about 2.3 microns, from about 1.2 to about 2 microns, from about 1.5 to about 1.9 microns, or about 1.7 microns. Specific examples of polyanilines selected for the transfer member, such as an ITB, are PANIPOL™ F, commercially available from Panipol Oy, Finland; and lignosulfonic acid grafted polyanilines.

The polyaryl ether layer of the present disclosure can further include other polymers selected from the group consisting of polyimide, polyaramide, polyphthalamide, fluorinated polyimide, polyimidesulfone, polycarbonate, polyamideimide (PAI), polysulfone, polyetherimide, polyester, polyamide, polyvinylidene fluoride (PVDF), and polyethylene-co-polytetrafluoroethylene, and/or their blends in an amount of from about 1 to about 95 weight percent, or from about 10 to about 60 weight percent of the total layer solids.

As illustrated herein, the carbon black, polyaniline, or other known conductive component is usually formed into a dispersion, such as a blend of the polyaryl ether polymer and/or a polyimide. With proper milling processes, uniform dispersions can be obtained, and the dispersion can be applied to or coated on a supporting substrate, such as a biaxially oriented poly(ethylene naphthalate) (PEN) substrate (KALEDEX™ 2000) having a thickness of 3.5 mils using known draw bar coating methods. The resulting film or films can be dried at high temperatures, such as from about 100° C. to about 200° C., or from about 120° C. to about 160° C. for a sufficient period of time, such as for example, from about 1 to about 30 minutes, or from about 5 to about 15 minutes while remaining on the substrate. After drying and cooling to room temperature, about 23° C. to about 25° C., the film or films on the substrate or separate substrates are automatically released from the substrate resulting in the functional intermediate transfer member or members as disclosed herein.

Adhesive layer components for the multi layered intermediate transfer member, and which layer is usually situated between the first layer substrate and the polyaryl ether polymer include a number of epoxys, urethanes, silicones, polyesters, and the like. Generally, the adhesive layer is a solventless layer, that is, materials that are liquid at room temperature (about 25° C.), and are able to crosslink to an elastic or rigid film to adhere at least two materials together. Specific examples include 100 percent solids adhesives including polyurethane adhesives from Lord Corporation, Erie, Pa., such as TYCEL® 7924 (viscosity from about 1,400 to about 2,000 cps), TYCEL® 7975 (viscosity from about 1,200 to about 1,600 cps) and TYCEL® 7276. The viscosity range of the adhesives is, for example, from about 1,200 to about 2,000 cps. The solventless adhesives can be activated with either heat, room temperature curing, moisture curing, ultraviolet radiation, infrared radiation, electron beam curing, or other known methods. The thickness of the adhesive layer is usually equal to or less than about 100 nanometers, and more specifically, this thickness is as illustrated hereinafter.

The thickness of each layer, when two layers of the polyimide base and the surface layer of the polyaryl ether and polysulfone polymer are present, in the intermediate transfer member can vary and is not limited to any specific value. In specific embodiments, the substrate layer thickness is, for example, from about 20 to about 300 microns, from about 30 to about 200 microns, from about 75 to about 150 microns, from about 50 to about 100 microns, and yet more specifically, about 100 microns, while the thickness of the polyaryl ether layer is, for example, from about 1 to about 50 microns, from about 1 to about 30 microns, from about 5 to about 25 microns, from about 10 to about 35 microns, and yet more specifically, about 20 microns. The adhesive layer thickness is, for example, from about 1 to about 100 nanometers, from about 5 to about 75 nanometers, or from about 40 to about 65 nanometers.

The disclosed intermediate transfer members are, in embodiments, weldable, that is the seam of the member like a belt is weldable, and more specifically, may be ultrasonically welded to produce a seam. The surface resistivity of the disclosed intermediate transfer member is, for example, from about $10^9$ to about $10^{13}$ ohm/sq, or from about $10^{10}$ to about $10^{12}$ ohm/sq. The sheet resistivity of the intermediate transfer weldable member is, for example, from about $10^9$ to about $10^{13}$ ohm/sq, or from about $10^{10}$ to about $10^{12}$ ohm/sq.

For the one layer intermediate transfer member, there is selected the polyaryl ethers illustrated herein, and available from a number of sources.

The intermediate transfer members illustrated herein, like intermediate transfer belts, can be selected for a number of printing, and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems, may be in the configuration of a sheet, a web, a belt, including an endless belt, an endless seamed flexible belt, and an endless seamed flexible belt; a roller, a film, a foil, a strip, a coil, a cylinder, a drum, an endless strip, and a circular disc. The intermediate transfer member can be comprised of a single layer, or it can be comprised of several layers, such as from about 2 to about 5 layers. In embodiments, the intermediate transfer member further includes an outer release layer.

Release layer examples, situated on and in contact with the polyaryl ether or in a two layer member, contact with the second layer, and where the first layer is free of a release layer, include low surface energy materials such as TEFLON®-like materials including fluorinated ethylene propylene copolymer (FEP), polytetrafluoroethylene (PTFE), polyfluoroalkoxy polytetrafluoroethylene (PFA TEFLON®), and other TEFLON®-like materials; silicone materials, such as fluorosilicones, and silicone rubbers, such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_w$ of approximately 3,500); and fluoroelastomers such as those sold as VITON® such as copolymers and terpolymers of vinylidenefluoride, hexafluoropropylene, and tetrafluoroethylene, which are known commercially under various designations as VITON® A, VITON® E, VITON® E60C, VITON® E45, VITON® E430, VITON® B910, VITON® GH, VITON® B50, VITON® E45, and VITON® GF. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON® A, (2) a class of terpolymers of vinylidenefluoride, hexafluoropropylene, and tetrafluoroethylene known commercially as VITON® B, and (3) a class of tetrapolymers of vinylidenefluoride, hexafluoropropylene, tetrafluoroethylene, and a cure site monomer, such as VITON® GF, having 35 mole percent of vinylidenefluoride, 34 mole percent of hexafluoropropylene, and 29 mole percent of tetrafluoroethylene with 2 percent cure site monomer. The cure site monomer can be those available from E.I. DuPont de Nemours, Inc., such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomer.

The layer or layers may be deposited on the substrate by well known coating processes. Known methods for forming the layers on the substrate, such as dipping, spraying such as by multiple spray applications of thin films, casting, flow-coating, web-coating, roll-coating, extrusion, molding, or the like, can be used, and more specifically, the layers are deposited in sequence by spraying such as by multiple spray applications, can be sting, web coating, flow-coating, and laminating.

The circumference of the intermediate transfer member, especially as it is applicable to a film or a belt configuration, is, for example, from about 250 to about 2,500 millimeters, from about 1,500 to about 3,000 millimeters, or from about 2,000 to about 2,200 millimeters with a corresponding width of, for example, from about 100 to about 1,000 millimeters, from about 200 to about 500 millimeters, or from about 300 to about 400 millimeters.

Specific embodiments will now be described in detail. These examples are intended to be illustrative, and are not limited to the materials, conditions, or process parameters set forth in these embodiments. All parts are percentages by weight of total solids unless otherwise indicated.

COMPARATIVE EXAMPLE 1

Preparation of a Polyimide Containing Intermediate Transfer Member

One gram of the polyaniline PANIPOL® F, a hydrochloric acid doped emeraldine salt obtained from Panipol Oy (Porvoo Finland), was mixed with 28.3 grams of the polyamic acid solution, VTEC™ PI 1388 (polyimide, 20 weight percent solids in NMP, obtained from Richard Blaine International, Incorporated). By ball milling this mixture for 2 hours with 2 millimeter stainless shot using an Attritor, a uniform dispersion was obtained. The dispersion was then coated on a glass plate using a draw bar coating method. Subsequently, the film obtained was dried at 100° C. for 20 minutes, and then 204° C. for an additional 20 minutes while remaining on the glass plate.

The film on the glass was then immersed into water overnight, about 23 hours, and the freestanding film was released from the glass automatically resulting in an intermediate transfer member with a 50 micron thick polyaniline/polyimide layer with a ratio by weight of 15 polyaniline and 85 polyimide.

EXAMPLE I

Preparation of a Single Layer Polyaryl Ether Containing Intermediate Transfer Member One gram of the polyaniline PANIPOL® F, a hydrochloric acid doped emeraldine salt obtained from Panipol Oy (Porvoo Finland), was mixed with 9 grams of the polyaryl ether, HTM 2600 as obtained from HT Materials Inc., Albany, N.Y., which ether possesses a number average molecular weight of about 11,000, a weight average molecular weight of about 30,000, a glass transition temperature of about 265° C., and 100 grams of methylene chloride. By ball milling this mixture with 2 millimeter stainless shot overnight, about 23 hours, a uniform dispersion was obtained. The dispersion was then coated on a biaxially oriented poly(ethylene naphthalate) (PEN) substrate (KALEDEX™ 2000) having a thickness of 3.5 mils using known draw bar coating methods. The resulting film was dried at about 120° C. for 1 minute while remaining on the PEN substrate. After drying and cooling to room temperature, the film on the PEN substrate was automatically released from the substrate resulting in a 50 micron thick intermediate transfer member of the polyaniline/polyaryl HMT 2600 ether with a ratio by weight of 10/90.

EXAMPLE II

Preparation of a Single Layer Polyaryl Ether Containing Intermediate Transfer Member 0.6 Gram of the polyaniline PANIPOL® F, a hydrochloric acid doped emeraldine salt obtained from Panipol Oy (Porvoo Finland), was mixed with 9.4 grams of a polyaryl ether, HTM 2600 from HT Materials Inc., Albany, N.Y., which possesses a number average molecular weight of about 11,000, a weight average molecular weight of about 30,000, a glass transition temperature of about 265° C., and 100 grams of methylene chloride. By ball milling this mixture with 2 millimeter stainless shot overnight, or 23 hours, a uniform dispersion was obtained. The dispersion was then coated on a biaxially oriented poly(ethylene naphthalate) (PEN) substrate (KALEDEX™ 2000) having a thickness of 3.5 mils using known draw bar coating methods. The resulting film was dried at about 120° C. for 1 minute while remaining on the PEN substrate. After drying and cooling to room temperature, the film on the PEN substrate was automatically released from the substrate resulting in a 50 micron thick intermediate transfer member of polyaniline/polyaryl HMT 2600 ether with a ratio by weight of 6/94.

EXAMPLE III

Preparation of a Two Layer Intermediate Transfer Member Comprising a Polyimide Containing Base Layer and a Polyaryl Ether Containing Surface Layer (A) One gram of PANIPOL® F, a hydrochloric acid doped emeraldine salt obtained from Panipol Oy (Porvoo Finland), was mixed with 28.3 grams of the polyamic acid solution, VTEC™ PI 1388 (polyimide, 20 weight percent solids in NMP, obtained from Richard Blaine International, Incorporated). By ball milling this mixture for 2 hours with 2 millimeter stainless shot using an Attritor, a uniform dispersion was obtained. The dispersion was then coated on a glass plate using a draw bar coating method. Subsequently, the film obtained was dried at 100° C. for 20 minutes, and then 204° C. for an additional 20 minutes while remaining on the glass plate.

(B) One gram of PANIPOL® F, a hydrochloric acid doped emeraldine salt obtained from Panipol Oy (Porvoo Finland), was mixed with 9 grams of a polyaryl ether, HTM 2600 obtained from HT Materials Inc., Albany, N.Y., which HTM 2600 possessed a number average molecular weight of about 11,000, a weight average molecular weight of about 30,000, a glass transition temperature of about 265° C., and 100 grams of methylene chloride. By ball milling this mixture with 2 millimeter stainless shot overnight, about 23 hours, a uniform dispersion was obtained. The dispersion was then coated on the above prepared (A) polyaniline/polyimide layer film using known draw bar coating methods. The resulting film was dried at about 120° C. for 5 minutes while remaining on the glass plate.

The two layer film on the glass was then immersed into water overnight, about 23 hours, and the freestanding film was released from the glass automatically resulting in a two layer intermediate transfer member with a 75 micron thick polyaniline/polyimide base layer with a ratio by weight of 15 polyaniline and 85 polyimide, and a 25 micron HMT 2600 polyaryl ether surface layer with a ratio by weight of 10 polyaniline and 90 polyaryl ether.

EXAMPLE IV

Preparation of a Two Layer Intermediate Transfer Member Comprising a Polyimide Containing Base Layer and a Polyaryl Ether Containing Surface Layer (A) One gram of PANIPOL® F, a hydrochloric acid doped emeraldine salt obtained from Panipol Oy (Porvoo Finland), was mixed with 28.3 grams of the polyamic acid solution, VTEC™ PI 1388 (polyimide, 20 weight percent solids in NMP, obtained from Richard Blaine International, Incorporated). By ball milling this mixture for 2 hours with 2 millimeter stainless shot using an Attritor, a uniform dispersion was obtained. The dispersion was then coated on a glass plate using a draw bar coating method. Subsequently, the film obtained was dried at 100° C. for 20 minutes, and then 204° C. for an additional 20 minutes while remaining on the glass plate.

(B) 0.6 Gram of PANIPOL® F, a hydrochloric acid doped emeraldine salt obtained from Panipol Oy (Porvoo Finland), was mixed with 9.4 grams of the polyaryl ether, HTM 2600 obtained from HT Materials Inc., Albany, N.Y., which possessed a number average molecular weight of about 11,000, a weight average molecular weight of about 30,000, a glass transition temperature of about 265° C., and 100 grams of methylene chloride. By ball milling this mixture with 2 millimeter stainless shot overnight, or 23 hours, a uniform dispersion was obtained. The dispersion was then coated on the above polyaniline/polyimide layer (A) using known draw bar coating methods. The resulting film was dried at about 120° C. for 5 minutes while remaining on the glass plate.

The two layer film on the glass was then immersed into water overnight, about 23 hours, and a freestanding film was released from the glass automatically resulting in a two layer intermediate transfer member with a 75 micron thick polyaniline/polyimide base layer with a ratio by weight of 15 polyaniline and 85 polyimide, and a 25 micron polyaryl ether surface layer thereover with a ratio by weight of 6 polyaniline and 94 HMT 2600 polyaryl ether.

EXAMPLE V

Preparation of a Three Layer Intermediate Transfer Member Comprising a Polyimide Containing Base Layer, a Solventless Adhesive Layer and a Polyaryl Ether Containing Surface Layer A three-layer intermediate transfer member with a polyimide base layer, a solventless adhesive layer thereover, and a polyaryl ether surface layer is prepared by repeating the process of Example III except that a solventless adhesive layer is incorporated between the polyimide base layer and the polyaryl ether surface layer.

The solventless adhesive, TYCEL® 7975-A (adhesive) and 7276 (curing agent) both available from Lord Corporation, Erie, Pa., is applied on the base layer by spray coating, and then the surface layer is coated as described in Example III.

The resulting three layer film on the glass substrate is then immersed into water overnight, about 23 hours, and the freestanding film is released from the glass automatically resulting in a three layer intermediate transfer member with a 75 micron polyaniline/polyimide base layer with a ratio by weight of 15/85; a 100 nanometer thick adhesive layer; and a 25 micron thick polyaniline/polyaryl ether surface layer with a ratio by weight of 10/90.

Surface Resistivity Measurement

The above ITB members or devices of Comparative Example 1, and Examples I, II, III and IV were measured for surface resistivity (averaging four to six measurements at varying spots, 72° F./65 percent room humidity) using a High Resistivity Meter (Hiresta-Up MCP-HT450 from Mitsubishi Chemical Corp.). The results, which illustrate the excellent surface resistivity for the Examples I, II, III, and IV member, are provided in Table 1.

TABLE 1

| | Surface Resistivity (ohm/sq) |
|---|---|
| Comparative Example 1 Polyaniline/Polyimide = 15/95 Single Layer ITB | $(1.26 \pm 0.32) \times 10^{12}$ |
| Example I Polyaniline/Polyaryl Ether = 10/90 Single Layer ITB | $(7.37 \pm 0.22) \times 10^{7}$ |
| Example II Polyaniline/Polyaryl Ether = 6/94 Single Layer ITB | $(1.04 \pm 0.18) \times 10^{12}$ |
| Example III Polyaniline/Polyimide = 15/95 Base Layer (75 μm) and Polyaniline/Polyaryl Ether = 10/90 Surface Layer (25 μm) ITB | $(5.63 \pm 0.16) \times 10^{9}$ |
| Example IV Polyaniline/Polyimide = 15/95 Base Layer (75 μm) and Polyaniline/Polyaryl Ether = 6/94 Surface Layer (25 μμm) ITB | $(1.13 \pm 0.27) \times 10^{12}$ |

The Example I and II members will possess, it is believed, a high $T_g$ (265° C.), low moisture absorption, and an acceptable friction coefficient.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:
1. An intermediate transfer member comprised of a polyaryl ether, wherein said polyaryl ether is represented by at least one of

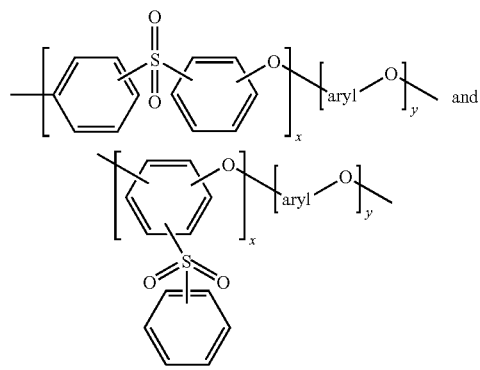

wherein aryl is one of

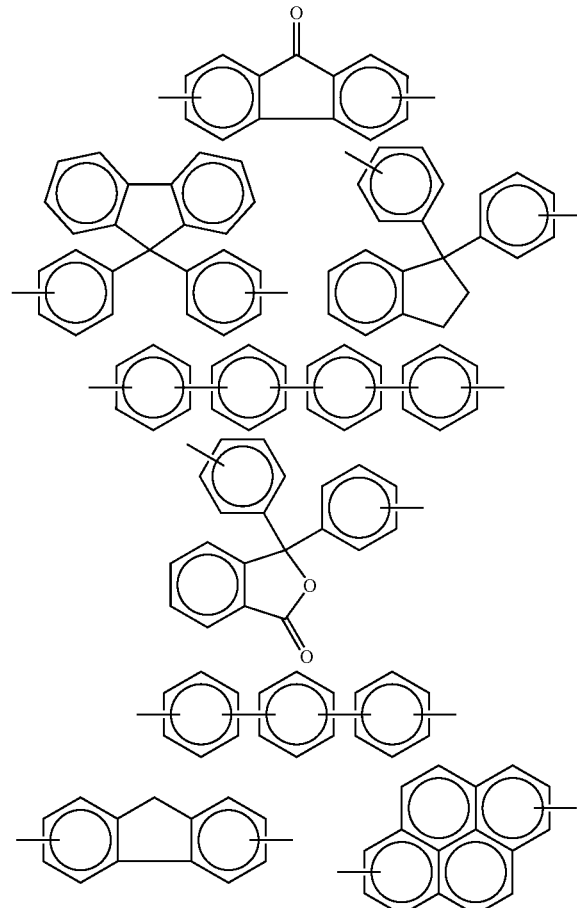

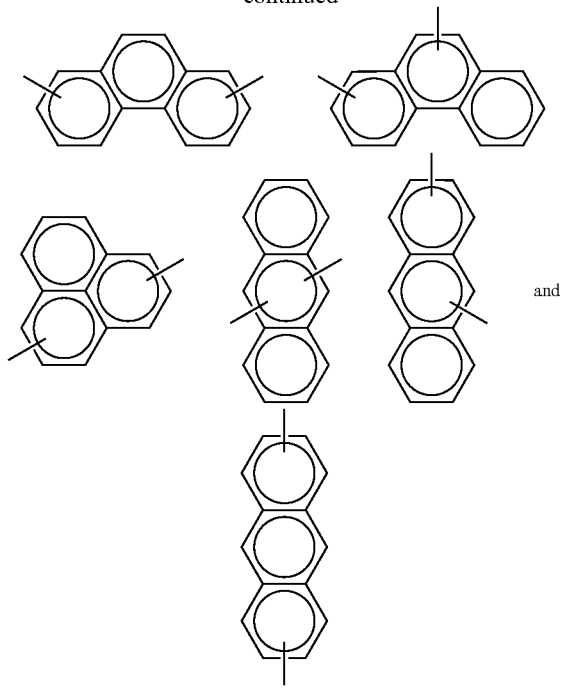

and wherein x is from about 50 to about 90 weight percent; y is from about 10 to about 50 weight percent, and wherein the total thereof is about 100 percent.

2. An intermediate transfer member in accordance with claim 1 wherein x is from about 60 to about 80 weight percent; y is from about 20 to about 40 weight percent; and wherein the total thereof is about 100 percent.

3. An intermediate transfer member in accordance with claim 1 wherein said polyaryl ether possesses a glass transition temperature of from about 250° C. to about 350° C.

4. An intermediate transfer member in accordance with claim 1 wherein said polyaryl ether possesses a glass transition temperature of from about 260° C. to about 300° C.

5. An intermediate transfer member in accordance with claim 1 wherein said polyaryl ether possesses a weight average molecular weight of from about 20,000 to about 300,000.

6. An intermediate transfer member in accordance with claim 1 wherein said polyaryl ether possesses a weight average molecular weight of from about 30,000 to about 100,000.

7. An intermediate transfer member in accordance with claim 1 further including a supporting substrate layer.

8. An intermediate transfer member in accordance with claim 1 further including in said polyaryl ether in the form of a layer, a conductive component of carbon black, a polyaniline, or a metal oxide, each present in an amount of from about 3 to about 60 percent by weight based on the weight of total solids.

9. An intermediate transfer member in accordance with claim 1 further including in said polyaryl ether in the form of a layer a polymer selected from the group consisting of polyimide, polyaramide, polyphthalamide, fluorinated polyimide, polyimidesulfone, polycarbonate, polyamideimide, polysulfone, polyetherimide, polyester, polyamide, polyvinylidene fluoride, polyethylene-co-polytetrafluoroethylene, and optionally mixtures thereof, each present in an amount of from about 1 to about 90 percent by weight based on the weight of total solids.

10. An intermediate transfer member in accordance with claim 1 with a thickness of from about 1 to about 200 microns.

11. An intermediate transfer member in accordance with claim 1 with a surface resistivity of from about $10^7$ to about $10^{13}$ ohm/sq.

12. An intermediate transfer member in accordance with claim 1 further containing a polyimde supporting substrate, and thereover said polyaryl ether.

13. An intermediate transfer member in accordance with claim 12 wherein said polyaryl ether is represented by

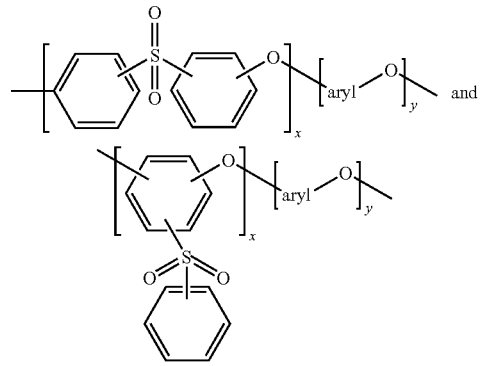

wherein aryl is one of

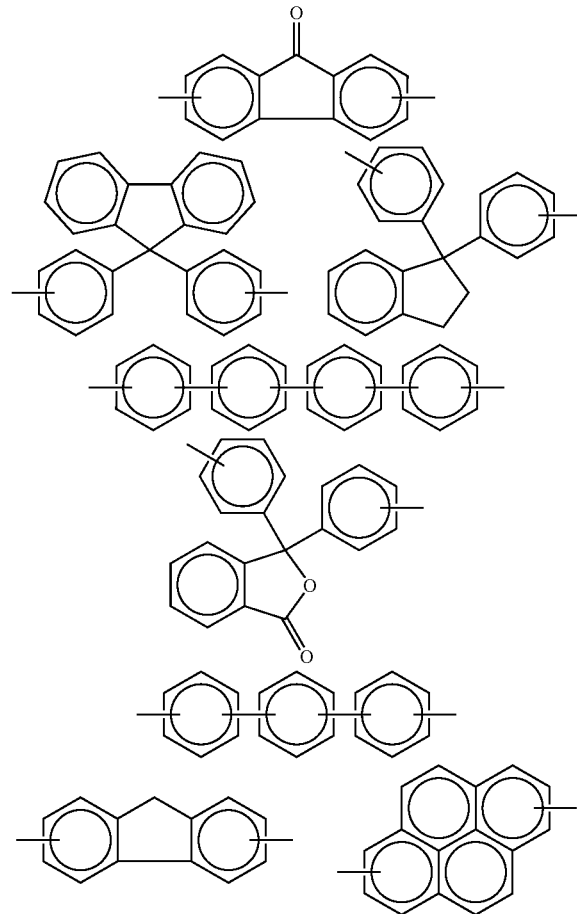

-continued

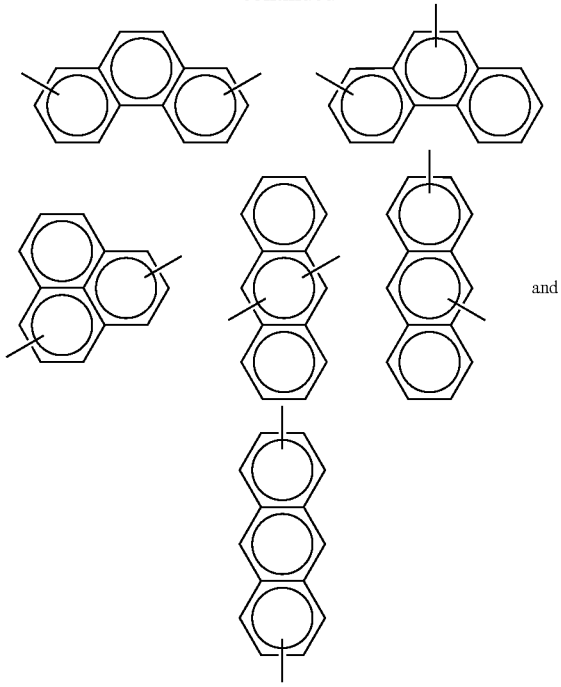

and wherein x is from about 50 to about 90 weight percent; y is from about 10 to about 50 weight percent; and wherein the total thereof is about 100 percent.

14. An intermediate transfer member in accordance with claim 12 wherein x is from about 60 to about 80 weight percent; y is from about 20 to about 40 weight percent; and wherein the total thereof is about 100 percent.

15. An intermediate transfer member in accordance with claim 12 wherein said polyimide is at least one of a polyimide, a polyamideimide, a polyetherimide, and mixtures thereof.

16. An intermediate transfer member in accordance with claim 12 wherein at least one of said substrate, and said polyaryl ether further includes a conductive component, and wherein said member further includes an adhesive layer situated between said substrate and said polyaryl ether layer.

17. An intermediate transfer member in accordance with claim 16 wherein said conductive component is carbon black, a polyaniline, or a metal oxide, each present in an amount of from about 3 to about 60 percent by weight based on the weight of total solids.

18. An intermediate transfer member in accordance with claim 12 further including an adhesive layer situated between said substrate and said polyaryl ether layer, and wherein said adhesive layer is comprised of an epoxy, a urethane, a silicone, a polyester, or mixtures thereof, and wherein at least one of said substrate and said polyaryl ether further includes a conductive component.

19. An intermediate transfer member in accordance with claim 12 further including in said polyaryl ether in the form of a layer a polymer selected from the group consisting of polyimide, polyaramide, polyphthalamide, fluorinated polyimide, polyimidesulfone, polycarbonate, polyamideimide, polysulfone, polyetherimide, polyester, polyamide, polyvinylidene fluoride, polyethylene-co-polytetrafluoroethylene, and mixtures thereof.

20. An intermediate transfer member in accordance with claim 12 wherein said member has a surface resistivity of from about $10^7$ to about $10^{13}$ ohm/sq.

21. An intermediate transfer member in accordance with claim 1 further comprising an outer release layer positioned on said polyaryl ether in the form of a layer, and wherein said polyaryl contains from 6 to about 48 carbon atoms.

22. An intermediate transfer member in accordance with claim 21 wherein said release layer is selected from the group consisting of a poly(vinyl chloride), a fluorinated ethylene propylene copolymer, a polytetrafluoroethylene, a polyfluoroalkoxy polytetrafluoroethylene, a fluorosilicone, a copolymer or terpolymer of vinylidenefluoride, hexafluoropropylene, and tetrafluoroethylene.

23. A transfer media comprised of a first polyimide supporting substrate layer, and thereover a second layer comprised of a polyaryl ether, and wherein at least one of said first layer and said second layer further contains a conductive component; said polyaryl ether being represented by

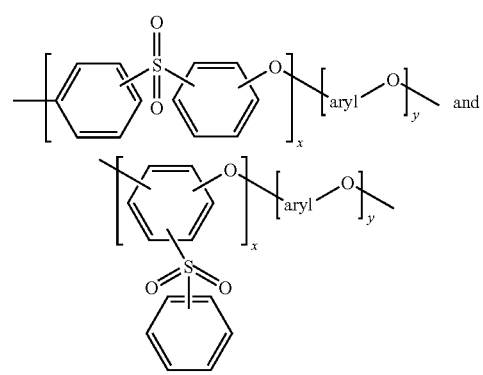

wherein aryl is one of

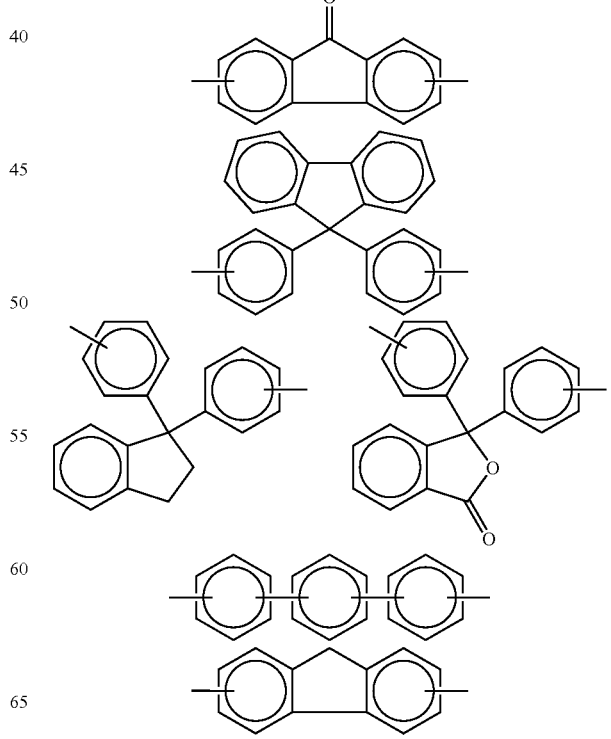

-continued

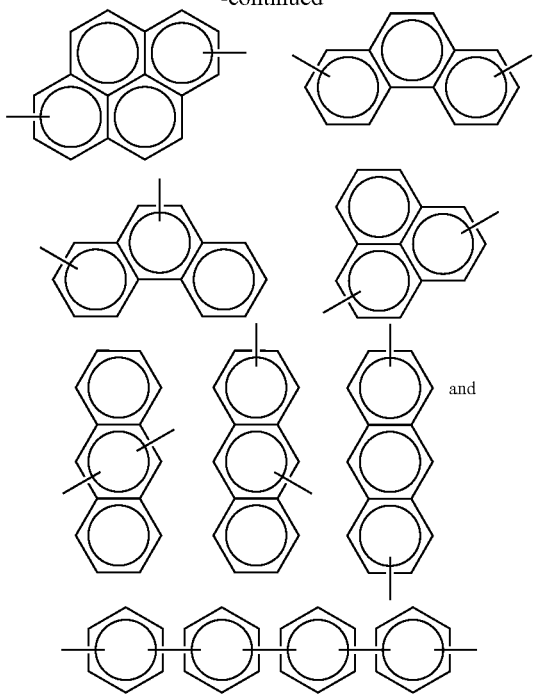

wherein x is from about 50 to about 90 weight percent; y is from about 10 to about 50 weight percent; and wherein the total thereof is about 100 percent.

24. A transfer media in accordance with claim 23 wherein x is from about 60 to about 80 weight percent; y is from about 20 to about 40 weight percent; and wherein the total thereof is about 100 percent.

25. A transfer media in accordance with claim 23 further including an adhesive layer situated between said first layer and said second layer, and wherein said first layer and said second layer contains said conductive component, and wherein said media is an intermediate transfer belt.

26. A transfer media in accordance with claim 25 wherein said first layer is of a thickness of from about 30 to about 200 microns, said adhesive layer is of a thickness of from about 1 to about 75 nanometers, and said polyaryl ether layer is of a thickness of from about 1 to about 30 microns.

27. An intermediate transfer belt comprised of a first polyimide base layer, and thereover a second surface layer comprised of a polyaryl ether as represented by wherein aryl is one of

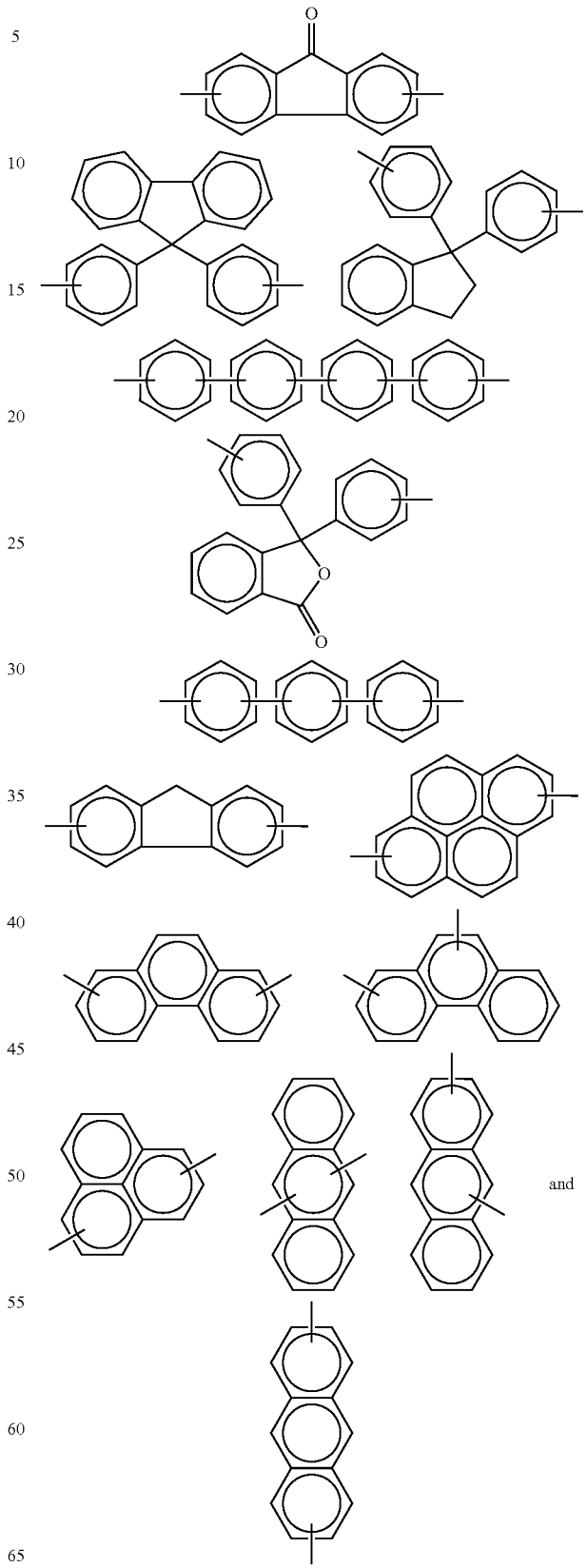

wherein x is from about 60 to about 75 weight percent; y is from about 25 to about 40 weight percent; and wherein the total thereof is about 100 percent.

28. An intermediate transfer member in accordance with claim 27 further including an adhesive layer, and further including a conductive material in at least one of the first polyimide layer, and said polyaryl layer, and wherein said polyimide is synthesized from a polyamic acid, esters of a polyamic acid, or by the reaction of a dianhydride and a diamine.

29. An intermediate transfer member in accordance with claim 28 wherein said dianhydride is selected from the group consisting of 9,9-bis(trifluoromethyl)xanthene-2,3,6,7-tetracarboxylic acid dianhydride, 2,2-bis-(3,4-dicarboxyphenyl)-hexafluoropropane dianhydride, 2,2-bis((3,4-dicarboxyphenoxy)phenyl)-hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)-ether dianhydride, di-(4-(3,4-dicarboxyphenoxy)phenyl)-sulfide dianhydride, di-(3,4-dicarboxyphenyl)methane dianhydride, di-(3,4-dicarboxyphenyl)-ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)-propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)-diphthalic dianhydride, 4,4'-(m-phenylenedioxy)diphthalic dianhydride, 4,4'-diphenylsulfidedioxybis (4-phthalic acid)dianhydride, 4,4'-diphenylsulfonedioxybis (4-phthalic acid)dianhydride, methylenebis(4-phenyleneoxy-4-phthalic acid)dianhydride, ethylidenebis(4-phenyleneoxy-4phthalic acid)dianhydride, isopropylidenebis-(4-phenyleneoxy-4-phthalic acid)dianhydride, hexafluoroisopropylidenebis(4-phenyleneoxy-4-phthalic acid)dianhydride, and the like; said diamine is selected from 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis (p-aminophenoxy)-diphenyl sulfone, 4,4'-diaminoazobenzene, 4,4'-diaminobiphenyl, 4,4'-diaminodiphenylsulfone, 4,4'-diamino-p-terphenyl, 1,3,-bis-(gamma-aminopropyl)-tetramethyl-disiloxane, 1,6-diaminohexane, 4,4'-diaminodiphenylmethane, 3,3'-diaminodiphenylmethane, 1,3,-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluorobiphenyl, 4,4'-diamino-2,2',3,3',5,5',6,6'-octafluorodiphenyl ether, bis[4-(3-aminophenoxy)-phenyl]sulfide, bis[4-(3-aminophenoxy)phenyl]sulfone, bis[4-(3-aminophenoxy)phenyl] ketone, 4,4'-bis(3-aminophenoxy)biphenyl, 2,2-bis[4-(3-aminophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane.

30. An intermediate transfer member in accordance with claim 1 wherein said polyaryl ether is represented by

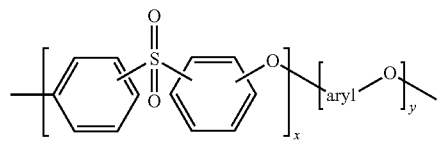

wherein aryl is

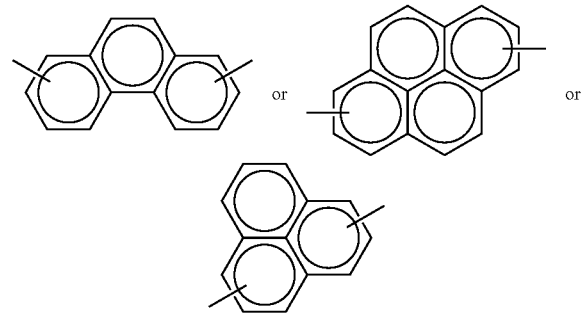

wherein x is from about 60 to about 75 weight percent; y is about 25 to about 40 weight percent; and wherein the total thereof is about 100 percent.

31. An intermediate transfer member in accordance with claim 1 wherein aryl is

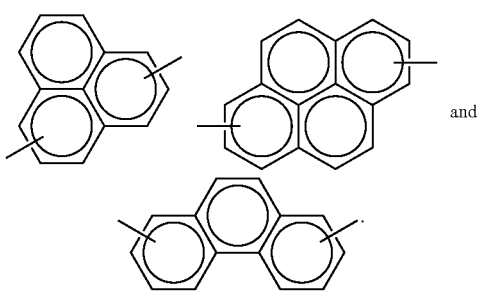

and

* * * * *